United States Patent [19]

Schwesig et al.

[11] 4,153,772

[45] May 8, 1979

[54] VULCANIZABLE MOLDING COMPOSITIONS

[75] Inventors: Helmut Schwesig; Karl-Heinz Nordsiek; Friedrich-Wilhelm Küpper, all of Marl, Fed. Rep. of Germany

[73] Assignee: Chemische Werke Huels Aktiengesellschaft, Marl, Fed. Rep. of Germany

[21] Appl. No.: 798,958

[22] Filed: May 20, 1977

Related U.S. Application Data

[63] Continuation of Ser. No. 608,997, Aug. 29, 1975, abandoned.

[30] Foreign Application Priority Data

Aug. 30, 1974 [DE] Fed. Rep. of Germany ....... 2441717

[51] Int. Cl.$^2$ .......................................... C08F 132/04
[52] U.S. Cl. ................................ 526/308; 152/330 R; 260/33.6 AQ; 264/328; 526/21; 526/36; 526/142

[58] Field of Search ........................................ 526/308

[56] References Cited

U.S. PATENT DOCUMENTS

| | | | |
|---|---|---|---|
| 3,816,382 | 6/1974 | Streck et al. | 260/93.1 |
| 3,849,509 | 11/1974 | Streck et al. | 260/677 R |
| 3,895,035 | 7/1975 | Berg et al. | 260/33.6 AQ |

*Primary Examiner*—Stanford M. Levin
*Attorney, Agent, or Firm*—Millen & White

[57] ABSTRACT

Vulcanizable polyalkenamer molding compositions comprising: (a) a polyoctenamer having an extensively cyclic structure with a trans-content of 50–70% and a reduced specific viscosity of 0.8–1.7 (dl./g.); and (b) conventional elastomer vulcanizing agents and additives have improved flow properties suitable for thermoplastic molding techniques together with mechanical properties in the vulcanizate comparable to SBR rubber.

1 Claim, No Drawings

VULCANIZABLE MOLDING COMPOSITIONS

This is a continuation of application Ser. No. 608,997 filed Aug. 29, 1975, now abandoned.

BACKGROUND OF THE INVENTION

This invention relates to vulcanizable polyoctenamer molding compositions having improved flow properties together with satisfactory mechanical properties in the vulcanizates produced therefrom.

It is known that articles of vulcanized elastomers, as compared to those of thermoplastic synthetic resins, exhibit additionally high elasticity as well as the usual comparable mechanical strength properties. After the vulcanizable macromolecules have been fixed by crosslinking bridges, this high elasticity ranges from the second order transition temperature up to the thermal decomposition temperature and spans, depending on the type of elastomer employed, temperatures ranging from about −100° C. to about 30 200° C. The enormous deformation capacity with a pronounced restoring force which can be observed within these limits, i.e., the reformation of the original force after a dimensional change without any essential permanent deformation, have securely established elastomers in fields of use not accessible in such a comprehensive range to any other material.

As compared to the manufacture of molded parts from thermoplastic synthetic resins, the processing of elastomers into vulcanized shaped objects requires a substantially higher expenditure due to the inherent characteristics of of the raw materials employed. In addition to the unavoidable crosslinking process, the raw materials, due to their substantially higher viscosity, must be subjected to mixing and deformation steps necessitating a high energy consumption. In order to conduct such steps on a technical scale, relatively heavy and expensive machinery must be utilized. The enormous amount of heat liberated by strong shear effects during the course of such process steps makes it compulsory to conduct the process discontinuously and in several stages. The considerable expenses resulting from the investment in machines and labor, which greatly burden the economy of the production of elastic articles, have previously resulted in displacement of the elastomers by nonelastomers in many fields of utilization, at the cost of relinquishing the typical elastomer properties which would often otherwise be desirable; e.g., see W. F. Watson (RAPRA) Revue generale du Caoutchuc et des Plastiques SV (1973) No. 6, pp. 463–465. For this reason, many attempts have been directed toward a simplification of the processing of elastomers with the goal of extensively adapting them to the processing characteristics of thermoplastic synthetic resins; e.g., see Klaus v. Hoerde, "Gummi/Asbest/Kunststoffe" (Rubber, Asbestos, Synthetic Resins) 4/1972, p. 332.

However, to solve this problem, it is not enough merely to lower the viscosity average molecular weights of the elastomers employed. The production of low-viscosity polymers, e.g., of butadiene or isoprene and/or copolymers thereof with styrene, does not present any technical problems. However, when such polymers of lower molecular weights are vulcanized, the lowering of the molecular weights is accompanied by a steady drop in the physical and mechanical properties of the finished articles. These properties are imparied to an intolerable degree if the molecular weight and viscosity of the used polymers have been reduced to optimal levels from the processing viewpoint.

In one attempt to avoid these disadvantages, low-molecular weight elastomers having functional terminal groups have been proposed, which undergo chain lengthening during the customary vulcanization process, i.e., in addition to the vulcanization crosslinking taking place, a lengthening of the molecule chain occurs; e.g., see S. H. Morall, "Gummi/Asbest/Kunststoffe" 7/72, pp. 658–662.

Apart from the fact that such attempts have not yet resulted in materials leading to satisfactory vulcanizate properties, especially as they are required for example in the manufacture of vulcanized tires, the manufacture of such elastomers having functional terminal groups is complicated and accordingly relatively expensive. The storage of the polymers used as the vulcanizable raw materials is problematic due to the terminal groups thereon which render the functionally modified polymers in most cases sensitive to atmospheric oxygen and moisture.

OBJECTS OF THE INVENTION

Accordingly, it is a general object of the present invention to overcome the disadvantages of the relevant prior art and to provide vulcanizable molding compositions having a combination of improved flow properties together with satisfactory mechanical properties in the vulcanizates prepared therefrom.

Another object of the present invention is to provide vulcanizable elastomer compositions which can be processed by thermoplastic polymer processing techniques.

A further object of the present invention is to provide vulcanizable elastomer compositions which exhibit a combination of good thermoplastic flow properties in the unvulcanized form together with good elastomeric mechanical properties in the vulcanized form.

An additional object of the present invention is to provide such compositions which can be used with conventional vulcanization recipes.

Upon study of the specification and appended claims, further objects and advantages of this invention will become apparent to those skilled in the art.

SUMMARY OF THE INVENTION

Briefly, the above and other objects of the present invention are attained in one aspect thereof by providing vulcanizable molding compositions comprising:
  (a) a polyoctenamer having an extensively cyclic structure with a trans-content of 50–70% and a reduced specific viscosity of 0.8–1.7 (dl./g.); and
  (b) conventional elastomer vulcanizing agents and additives.

DETAILED DISCUSSION

As is known, polyalkenamers are polymers obtained from cyclic olefins exhibiting at least one unsubstituted ring double bond with the aid of a so-called metathesis catalyst under ring opening; e.g., see DAS (German Published Application No. 1,299,868; DOS (German Unexamined Laid-Open Application) No. 1,570,940; DOS No. 1,595,739; DOS No. 1,654,038; British Pat. No. 1,124,456; British Pat. No. 1,194,013; British Pat. No. 1,182,975; DOS No. 1,720,798; DOS No. 1,770,143 and DOS No. 1,805,158, as well as corresponding U.S. Pat. Nos. 3,804,803; 3,816,382; 3,816,384; 3,821,328;

3,836,593; 3,846,365; 3,849,509 and 3,895,035, the contents of which are incorporated by reference herein.

When such polymerizations are conducted in the substantial absence of open-chain mono- and/or unconjugated di- or polyolefin molecular weight regulators, the resultant polyalkenamers are characterized by an extensively cyclic structure required in the polyoctenamers to be used according to this invention; in other words, care must be taken during the manufacture thereof that no more than 1 molar percent, preferably 0.05-0.6 molar percent of such molecular weight regulators be present in the cyclooctene and/or substituted cyclooctene monomer employed in the polymerization process.

By polyoctenamers having an extensively cyclic structure as used herein are meant such polymers in which the predominant portion, i.e. 50 to 95%, of the macromolecules is of cyclic nature. Said polyoctenamers contain a low molecular weight portion with molecular weights from 220 to 6000 in an amount from 2 to 30 wt. % based on the total polyoctenamer.

The low molecular weight portion of said polyalkenamers consists of more than 70%, preferably more than 90% up to 100% of cyclic macromolecules.

These facts can be proved by Gel Permeation Chromatography (GPC) and Mass Spectrometry (Makromolekulare Chemie, Band 175, 1974, Jg. 861).

No protection is claimed within the scope of this application for the manufacture of the polyoctenamers usable according to the invention, since such manufacture can be accomplished by methods known in the prior art. In general, the cyclooctene and/or the substituted cyclooctene is polymerized in a suitable solvent with the aid of a metathesis catalyst.

As is known, metathesis catalysts are mixed catalysts containing compounds of metals of subgroups V to VII of the Periodic Table, generally those of niobium, tantalum, molybdenum, tungsten and/or rhenium, as well as compounds of the metals of main groups I to III of the Periodic Table and/or the alkyls or hydrides thereof, optionally with further ligands, e.g., halogen, alkoxyl, or carboxylate or, in place thereof, Lewis Acids. The metathesis catalysts can, as is likewise known, contain further activating additives such as alcohols, epoxides, tert.-butyl hypochlorite, peroxides, carboxylic acids, aromatic nitro compounds, vinyl halides, vinyl and allyl ethers and esters, etc.

Another aspect to be considered during polymerization is that conjugated diolefins, e.g., butadiene, have a very adverse effect on the catalyst. Therefore, these compounds must be most extensively removed, e.g., by selective hydrogenation or other chemical or physical measures to reduce the concentration thereof in the polymerization reaction mixture to less than 0.01 mole %, preferably less than 0.001 mole %. Alkines, e.g. acetylene, 1-butyne, 2-butyne or phenylacetylene, are also strong metathesis catalyst poisons and thus must also be extensively eliminated to reduce the concentration thereof in the polymerization reaction mixture to less than 0.01 mole %, preferably less than 0.001 mole %.

The cycloolefin metathetical polymerization can be conducted to those solvents suitable for use in polymerization with the aid of Ziegler-Natta catalysts. The most important representatives from such normally liquid, inert aliphatic, alicyclic, aromatic and halogenated hydrocarbons are the following: pentane, hexane, heptane, n- and isooctane, isononane (hydrogenated trimer propene), n-decane, isododecane (hydrogenated tetramer propene), cyclopentane, cyclohexane, methylcyclopentane, methylcyclohexane, ethylcyclohexane, isopropylcyclohexane, cyclooctane, decahydronaphthalene, hydrogenated terpenes such as pinane and camphane, cyclohexene and its substitution products, benzene, toluene, o-, m-, p-xylene, ethylbenzene, o-, m-, p-diethylbenzene, n-propylbenzene, isopropylbenzene and other mono- to polyalkyl benzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene, 1,2-dichloroethane, etc.

The essential factor is that the solvents be used in a form maximally free of water and other H-acidic compounds, as well as compounds having an electron donor function (Lewis bases), which is ensured by suitable purification so as to reduce the concentration of water and other H-acidic substances in the polymerization reaction mixture to less than 0.01 mole %, preferably less than 0.001 mole %, and to reduce the concentration of Lewis bases therein to less than 0.01 mole %, preferably less than 0.001 mole %. Except for very small quantities on the order of below 0.001 mole % optionally added to achieve certain effects, such impurities generally impair the catalyst activity.

Any suitable ratio between the cycloolefin monomers to be polymerized and the solvents can be selected for use during the polymerization. Dilution is generally effected so that the viscosity is within a range ensuring satisfactory agitation and pumping.

The polymerization is generally conducted at temperatures of between about $-50°$ C. and $+80°$ C. Advantageously, the process is carried out at temperatures of between about $-30°$ C. and $+60°$ C., preferably in the range between about $-20°$ C. and $+40°$ C.

One skilled in the art is capable, by means of a few preliminary experiments, of adjusting the particulars of a suitable catalyst system and the polymerization conditions (solvent, temperature, reaction time, amount of regulator) so that the polyoctenamers are obtained having an extensively cyclic structure as defined above together with a trans-content of 50-70%, preferably 55-65% as determined by infrared spectroscopy, and a reduced specific viscosity (RSV) of 0.8-1.7 d../g., preferably 1.0-1.5 dl./g., measured as a solution of 0.1 g/dl polymer in "Decalin" (decahydronaphthalene) at 135° C.

After polymerization is finished, the polyoctenamers are conventionally isolated and purified. For example, if the polyoctenamers are obtained in solution or liquid form, the catalyst residues are removed after short-stopping the polymerization, e.g., with an alcohol or other H-acidic compound, by washing out the polymer-containing phase with an aqueous or aqueous-alcoholic solution of agents having a dissolving or chelating effect on the catalyst residues which are first present as alcoholates or compounds of the H-acidic substances. Such compounds having a dissolving or chelating effect are known in the art and include acids, bases or complex-forming agents, e.g., acetylacetone, citric or tartaric acid, ethylenediaminetetraacetic acid, nitrilotriacetic acid, etc. Thereupon, the polymers are separated by precipitation, e.g., by pouring into a precipitant such as methanol, isopropanol or acetone, or by distilling off the solvent, e.g., by introducing steam under pressure or passing the polymer solution through nozzles into hot water. To protect against oxidation, gelling, and other aging phenomena, it is possible to admix the polyalkenamers during various stages of the processing operation with antiaging stabilizers, e.g., one or more such aromatic amines or sterically hindered phenols, it con-ventional stabilizing amounts. Further purification can be conducted by reprecipitating the polymer, if this should prove necessary. After these operations, the polymer is dried in a conventional manner.

As component (b), the vulcanizable molding compositions of this invention contain the vulcanizing agents and additives customary in the rubber and elastomer technology. Primarily suitable as the vulcanizing agents are sulfur in combination with vulcanization accelerators, zinc oxide and higher fatty acids, e.g., stearic acid. Peroxides or special sulfur donors, e.g., N,N'-morpholine disulfide, or special thiurams for crosslinking can be employed with similar success.

Suitable vulcanizable molding compositions contain, based on the polyalkenamer, 0.1-2.5 wt. %, preferably 0.2-0.7 wt. %, sulfur (calculated as free sulfur); 0.3-3.0 wt. %, preferably 0.4-1.0 wt. % vulcanization accelerators. (Accelerators are tetraalkyl—esp. dialkyl-thiuram mono—esp. diaryl disulfides, e.g. tetramethyl thiuram disulfide; mercapto—esp. sulfonamide accelerators, e.g. dibenzothiazyl disulfide, N-cyclohexyl 2-benzothiazole sulfonamide; guanidine accelerators, e.g. diphenyl guanidine); 0.1-50 wt. %, preferably 1.0-5.0 wt. % zinc oxide; and 0.5-5.0 wt. %, preferably 1.0-3.0 wt. % higher fatty acids.

Advantageous additives are, above all, active strengthening fillers and plasticizers. Suitable fillers are carbon blacks of all stages of activity, as well as the customary mineral products, e.g., chalk, silicates and highly active silicic acids.

Suitable vulcanizable molding compositions contain, based on the polyalkenamer, 20-50 wt. %, preferably 25-40 wt. %, and especially 28-35 wt. %, carbon black; or 10-60 wt. %, preferably 20-50 wt. %, and especially 30-40 wt. %, active silicic acid, respectively in combination with carbon black.

Suitable plasticizers include various refinery products; it is possible to use oils having predominantly aromatic, naphthenic or paraffinic components. The plasticizers are added to the vulcanizable compositions in customary amounts, based on the polyalkenamers, of generally 1-25 wt. %, preferably 3.5-15 wt. %, and especially 5-10 wt. %.

Furthermore, conventional antiaging and ozone-protection agents can also be added to the vulcanizable molding compositions of this invention in customary effective amounts.

The vulcanizable molding compositions of the present invention surprisingly exhibit rheological properties heretofore generally associated with thermoplastic rather than elastomeric molding compositions, while the vulcanized products compare favorably to vulcanized elastomers heretofore employed in the making of molded articles such as automobile tires. In particular, the vulcanizable molding compositions of the present invention are characterized by compounding ML-4 from 5 to 15 (DIN 53,523) (prior art: 50-70), and compounding Defo from 150/2 to 400/5 (DIN 53,514) (prior art: 1500/15-2500/30).

The flowable molding compositions of this invention can be produced from the ingredients employed with the aid of conventional mixing units, e.g., rolling mills or masticators, preferably internal plunger mixers. A particularly advantageous embodiment of the invention resides in starting with a masterbatch of the polyoctenamer in solution premixed with fillers and plasticizers and adding to these premixes the other vulcanizing and antiaging or ozone-protection agents in the customary mixing machines. However, it is also possible to convert such masterbatches of polyoctenamer, filler and plasticizer oil into pulverized form (e.g., see DOS's Nos. 2,135,266 and 2,214,121 as well as German Patent Application P 24 39 237.8), to which the further mixture components can be added in fluid mixers. Furthermore, it is possible to admix, in dosed amounts, the residual mixture components to the powdery masterbatches by way of vibrating chutes, e.g., continuously directly before processing in injection-molding machines.

As compared to conventional vulcanizable elastomer materials, considerable savings and advantages are obtained due to the special structure of the polyoctenamers used according to this invention, particularly in a drastically reduced energy consumption and a marked drop in the injection output temperature of the mixture material during mixture in a masticator.

Customarily, the vulcanizing adjuvants are added to the basic mixtures only in a second working step. Since the readily flowing mixtures of the present invention heat up to a lesser extent during production, auxiliary vulcanizing agents can now be incorporated into the first mixing step. The second mixing step in the masticator is thus eliminated, whereby a further saving is attained in time and energy requirements.

The excellent properties of the molding compositions of this invention, especially their superiority over elastomer mixtures prepared according to the prior art, are especially apparent when using forming processes customarily used in industry for molding thermoplastic synthetic resins. In recent years, automatic injection-molding machines have moved to an increasing extent into the foreground even for the manufacture of elastic articles. Due to the high viscosity of the usual elastomer mixtures, the expenditure in machinery required for this technique is considerably larger during the manufacture of elastomer products as compared to thermoplastic synthetic resins. As regards this aspect, the molding compositions of this invention afford important advantages due to their favorable flow properties. This fact has maximum bearing on the injection-molding production of large-volume molded parts such as tires, bumpers, or general vehicular safety components in automobile manufacture.

Thus, as compared to the state of the art as presently existent in the vulcanizable elastomer processing industry, the molding compositions of the present invention now make it possible to process large molded parts at much lower expenditures, i.e., to be able to utilize the same relatively simple and inexpensive machinery and energy requirements such as have previously been employed for the processing of thermoplastic synthetic resins.

Of particular practical importance is the discovery that the molding compositions of the present invention, in addition to the advantageous manufacturing properties, result in vulcanizates which correspond in their spectrum of physical properties to those of vulcanizates made from conventional, highly viscous elastomers.

For example, typical properties of vulcanizates prepared from the examples of compositions of the present invention are as follows:

| | |
|---|---|
| Tensile strength, kp./cm² (DIN 53 504) | 130–160 |
| Elongation, % (DIN 53 504) | 450–600 |
| Modulus 300%, kp./cm² (DIN 53 504) | 55–70 |
| Hardness, ° Shore (DIN 53 505) | 58–62 |
| Rebound Elasticity, % (DIN 53 512) | 28–35 |
| Abrasion, mm³ (DIN 53 516) | 95–120 |
| Heat liberation after 10 min (ASTM D 623-58 aT = Goodrich flexometer) | 20–25 |

The invention will be explained with reference to the following examples.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, the temperatures are set forth uncorrected in degrees Celsius; unless otherwise indicated, all parts and percentages are by weight.

EXAMPLE 1

I. Production of Polyoctenamer

A 2-liter chlorinating pot reactor equipped with an agitator, an internal thermometer and a protective gas inlet pipe is heated for 15–20 minutes with hot nitrogen. After cooling under a protective gas atmosphere, 200 ml. of cyclooctene is dissolved in 400 ml. of hexane and 0.4 molar percent of 1-octene in hexane, based on the total amount of olefins, is added as a regulator. The catalyst components $WCl_6$ (1 millimole) and acetic acid (3 millimoles) are added thereto. After cooling to 0° C., the remaining catalyst component $AlC_2H_5Cl_2$ (4 mmol) is added. The polymerization begins under heating and leads after only a few minutes to a rise in viscosity. The solution is stirred a total period of 45 minutes at 20° C. A mixture of 200 ml. methanol, 5 g. potassium hydroxide and 2 g. 2,6-di-tert.-butyl-p-cresol (as the stabilizer) is then added, and the entire mixture is stirred for another 15 minutes. Subsequently, the polyoctenamer is precipitated by adding 1 liter of methanol. After vigorous agitation, the methanol/hexane/cyclooctene mixture is suction-filtered; the remaining polymer is extracted by boiling with about 1.5 liters of methanol for 2 hours, and after removal of the solvent by vacuum-filtering the product is dried to a constant weight in a vacuum drying chamber at 50° C. Yield: 149 g.

The RSV value (measured as a solution of 0.1 g/dl polymer in "Decalin" at 135° C. using an Ostwald-type viscosimeter) is 1.5 dl./g.; the trans:content (determined by IR spectroscopy using a Perkin Elmer Model 457 Grating Intrared Spectrophotometer) is 65%.

II. Preparation of Vulcanizable Molding Compositions and Vulcanizates Thereof From the polyoctenamer prepared in accordance with (I), the vulcanizable molding composition as set forth below is produced:

| | | |
|---|---|---|
| Polyoctenamer | 100.0 | parts |
| Zinc oxide | 5.0 | " |
| Stearic acid | 2.0 | " |
| Antiaging substance[1] | 1.0 | " |
| ISAF (intermediate super abrasion furnace) carbon black | 50.0 | " |
| Highly aromatic plasticizer[2] | 10.0 | " |
| "Vulkacit" thiuram[3] | 0.3 | " |
| "Vulkacit CZ"[4] | 1.0 | " |
| Sulfur | 0.5 | " |

[1]N-isopropyl-N'-phenyl-N-phenylene diamine
[2]high boiling fractions of condensed aromatics
[3]tetramethyl thiuram disulfide
[4]N-cyclohexyl-2-benzothiazole-sulfenamide The fillers and auxiliary vulcanizing agents are mixed into the composition in a plunger-type kneader (manufacturer: Werner+Pfleiderer, Stuttgart), type GK 2. Speed: 40 r.p.m.; average jacket temperature: 20° C.

The processing data are as follows:

| | |
|---|---|
| Mixing time | 3 min. |
| Energy consumption per kg. of mixture | 0.07 kW . h |
| Maximum energy peak | 12 kW |
| Ejection temperature | 70° C. |
| Mixture ML-4 (according to DIN 53 523) | 10 |

As a comparison (denoted as Comparative Example 1 hereinbelow), a mixture is selected according to the prior art on the basis of a blend of a butadiene-styrene copolymer (SBR 1712) and an oil-extended 1,4-cis-containing polybutadiene with a correspondingly adapted recipe for passenger car tire treads, having the following composition:

| | | |
|---|---|---|
| SBR 1712 | 82.5 | parts |
| Polybutadiene | 55.0 | " |
| Coumarone resin | 2.0 | " |
| Zinc oxide | 3.0 | " |
| Stearic acid | 2.0 | " |
| Antiaging substance[1] | 2.5 | " |
| ISAF black | 85.0 | " |
| Highly aromatic plasticizer[2] | 15.0 | " |
| "Vulkacit"[3] | 1.5 | " |
| Sulfur | 2.1 | " |

[1]N-isopropyl-N'-phenyl-N-phenylene diamine
[2]high boiling fractions of condensed aromatics
[3]tetramethyl thiuram disulfide The fillers and auxiliary vulcanizing agents are incorporated into the mixture in the plunger-type kneader, type GK 2. (manufacturer: Werner+Pfleiderer, Stuttgart) Speed: 40 r.p.m.; average jacket temperature: 80° C.

The processing data are as follows:

| | |
|---|---|
| Mixing time | 4 min. |
| Energy consumption per kg. of mixture | 0.21 kW.h |
| Maximum energy peak | 15 kW |
| Ejection temperature | 160° C. |
| Mixture ML-4 (according to DIN 53 523) | 60 |

It can clearly be seen that the molding compositions of this invention are more readily processable than a mixture for passenger car tire treads starting with an SBR/BR blend.

III. Vulcanizing Test

The vulcanizate data of the molding compositions according to Example 1(II) (mixture 1), further molding compositions of this invention (mixtures 2–4) of a recipe as set forth in Example 1 but with other trans-contents and RSV values of the polyoctenamers, as well as of Comparative Example 1 are indicated below:

| Mixture | 1 | 2 | 3 | 4 | Comparative Example |
|---|---|---|---|---|---|
| Polyoctenamer with trans-content % | 65 | 54 | 60 | 65 | — |
| with RSV dl/g. | 1.5 | 1.3 | 1.2 | 0.9 | — |
| Vulcanization 30 min. at 150° C. Plates 4 mm. thick |  |  |  |  |  |
| Tensile strength kp./cm² (1) | 162 | 154 | 142 | 132 | 150 |
| Elongation % (1) | 500 | 540 | 550 | 575 | 500 |
| Modulus 300% kp./cm² (1) | 85 | 69 | 65 | 62 | 75 |
| Hardness ° Shore (2) | 65 | 61 | 62 | 61 | 60 |
| Rebound elasticity % (3) | 41 | 37 | 37 | 33 | 35 |
| Abrasion mm³ (4) | 81 | 99 | 90 | 107 | 100 |
| Heat liberation after 10 min (5) (ASTM D 623-58 aT = Goodrich flexometer) | 19.0 | 20.5 | 19.5 | 19.5 | 17.5 |

(1) DIN 53 504
(2) DIN 53 505
(3) DIN 53 512
(4) DIN 53 516
(5) ASTM D 623-58 aT

To determine the abrasion resistance of the vulcanizates under practical conditions, tire tests were conducted. As a further comparison material (Comparative Example 2), a tire tread was utilized based on oil-containing butadiene-styrene rubber (SBR 1712). The results set forth below were obtained under the following conditions:

| Tire dimension | 175 SR 14 | |
|---|---|---|
| Velocity: | 100 kg./hr. ordinary highway | respectively 50% of the total distance |
|  | 140 kg./hr. superhighway | |
| Tire: | tread subdivided into 5 segments | |
| Stress: | 0.26 mm. of abrasion per 1,000 km. | |
| Test vehicle: | Daimler Benz 230/8 | |
| Duration of test: | 10,000 km. | |

| Mixture | 1 | 3 | 4 | Comparative Example 1 | Comparative Example 2 |
|---|---|---|---|---|---|
| Abrasion index | 100 | 84 | 75 | 100 | 75 |

The test results show that the readily flowing molding compositions of this invention can be used for the manufacture of vulcanizates for tire tread production having physical properties which correspond to the prior art but can be prepared using the techniques of thermoplastic resin technology.

EXAMPLE 2

Experiments were conducted with mixture 1 of Example 1(II) on an injection-molding machine with a screw diameter of 50 mm. and a screw length of 10 D (10×diameter). When evaluating the flow path of spiral-shaped test specimens, extraordinarily improved flow properties were displayed by the molding compositions of this invention as compared to a low-pressure polyethylene, melt index (MF; 190/5): 20 g./10 min., as well as compared to Comparative Example 1.

| Material | Mixture 1 | Comparative Example 1 | LP Polyethylene |
|---|---|---|---|
| Molding temperature | 190° C. | 190° C. | 70° C. |
| Barrel temperature | 70°/80°/90° C. | 70°/80°/90° C. | 210°/230°/250° C. |
| Injection pressure, atm. gauge | Lengths of Spiral Specimens, cm. | | |
| 20 | 27 | 12 | 18 |
| 60 | 55 | 24 | 34 |
| 100 | 75 | 35 | 46 |
| 120 | 88 | 40 | 51 |

Standard rods punched from the spiral specimens showed the following vulcanization properties for mixture 1:

Tensile strength:—125 kg./cm²
Elongation:—620%
Hardness:—58° Shore

On other injection-molding machines having a screw diameter of 100 mm. and a screw length of 12 D, relatively thin-walled molded articles were produced from mixture 1 and from comparative mixture 1. Mixture 1 according to this invention completely filled the mold cavities; comparison mixture 1, however, filled only 40–54% of the mold cavity volume.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A vulcanizable molding composition prepared by a process for the production of vulcanizable elastomer molding composition with improved rheological properties and capable of being processed by thermoplastic polymer processing techniques, characterized by a compounding ML-4 value determined according to DIN 53,523 of from 5 to 15 and a compounding Defo value determined according to DIN 53,514 of from 150/2 to 400/5, which comprises blending into a molding composition a mixture of (a) a polymer component consisting of a polyoctenamer in which 50–95% by weight of the macromolecules are cyclic, said polyoctenamer containing 2–30 weight percent thereof of a low molecular weight portion comprising 90–100% by weight cyclic macromolecules having a molecular weight of 220–6000 as determined by gel permeation chromatography, said polyoctenamer having a trans-content of 50–60% and a RSV of 1.0–1.5 dl/g. as measured in a solution of 0.1 g/dl. polymer in decahydronaphthalene at 135° C.; and (b) polyoctenamer vulcanizing agents and additives.

* * * * *